United States Patent [19]

Takeuchi et al.

[11] Patent Number: 4,760,394
[45] Date of Patent: Jul. 26, 1988

[54] ANTENNA FOR TRANSMITTING AND/OR RECEIVING RADIO WAVES BY WAY OF ELECTROMAGNETIC INDUCTION

[75] Inventors: Mikio Takeuchi; Kinichiro Nakano, both of Zama; Motoki Hirano, Yokohama; Takahisa Tomoda, Sagamihara, all of Japan

[73] Assignee: Nissan Motor Company, Limited, Yokohama, Japan

[21] Appl. No.: 895,371

[22] Filed: Aug. 11, 1986

[30] Foreign Application Priority Data

Aug. 12, 1985 [JP] Japan ................... 60-177291

[51] Int. Cl.⁴ .................. H04Q 9/00; E05B 49/00
[52] U.S. Cl. ................. 340/825.540; 340/825.690; 361/172
[58] Field of Search ............... 340/825.31, 825.54, 340/825.69, 696; 361/172

[56] References Cited

U.S. PATENT DOCUMENTS

| | | | |
|---|---|---|---|
| 3,196,440 | 7/1965 | Weinstein | 340/696 |
| 4,129,855 | 12/1978 | Rodrian | 340/825.54 |
| 4,317,157 | 2/1982 | Eckloff | 340/825.69 |
| 4,354,189 | 10/1982 | Lemelson | 340/825.54 |
| 4,447,808 | 5/1984 | Marcus | 340/825.69 |
| 4,471,343 | 9/1984 | Lemelson | 340/825.31 |
| 4,550,444 | 10/1985 | Uebel | 340/825.54 |

FOREIGN PATENT DOCUMENTS

| | | |
|---|---|---|
| 0138090 | 4/1985 | European Pat. Off. . |
| 1646610 | 11/1952 | Fed. Rep. of Germany . |
| 972731 | 9/1959 | Fed. Rep. of Germany . |

Primary Examiner—Donald J. Yusko
Attorney, Agent, or Firm—Foley & Lardner, Schwartz, Jeffery, Schwaab, Mack, Blumenthal & Evans

[57] ABSTRACT

An antenna for an automotive keyless entry system can ensure radio-wave transmission between a transmitter and a controller and can be conveniently mounted on a vehicle body. The antenna for an automotive keyless entry system, has a first planar antenna loop, and a second antenna loop disposed within the first antenna loop and lying in the plane thereof. The axis of the second antenna loop is substantially perpendicular to the axis of the first antenna loop. The first and second antenna loops form an antenna assembly which can be conveniently mounted on the vehicle body as, for example, within a door mirror of the vehicle.

33 Claims, 6 Drawing Sheets

ANTENNA FOR TRANSMITTING AND/OR RECEIVING RADIO WAVES BY WAY OF ELECTROMAGNETIC INDUCTION

BACKGROUND OF THE INVENTION

The present invention relates generally to a keyless entry system for operating one or more vehicle devices, such as a door lock device, a trunk lid opener and so forth, by means of a radio waves carrying a preset code or codes and transmitted between a controller mounted on a vehicle and a pocket-portable transmitter carried by a user. More specifically, the invention relates to an antenna for radio-wave communication between the controller and the transmitter by way of electromagnetic induction. Furthermore, the invention relates to a mounting structure for the antenna for radio-wave communication.

In the recent years, a new keyless entry system for automotive vehicles has been proposed and put on the market. This system does not require mechanical key operation or manual entry of a preset code to operate various vehicle devices, such as the vehicle door lock, the trunk lid opener and so forth. In this keyless entry system, a pocket-portable transmitter is used as a source of a preset code signal. The transmitter generates a radio-wave carrying the preset code and transmits the preset code-carrying radio-wave to a controller mounted on a vehicle. The controller receives the radio-wave and decodes the preset code in the radio wave. When the decoded code matches a preset code in the controller, a control signal is sent from the controller to the vehicle device to be operated.

To establish radio-wave communication between the transmitter and the controller, antennas are provided both for the transmitter and the controller. In the proposed system, radio-wave communication between the controller and the transmitter is generally short-range. For instance, unlocking the door lock or opening of the trunk lid are necessary only when the user is actually near the vehicle. Furthermore, it would be comfortable for the door to be unlocked when the user is standing just in front of the door or for the trunk to be opened when the user is standing just behind the vehicle. In this view, the radio-wave communication between the transmitter and the controller is usually performed within a range of less than 1 m. For such relative short-distance communication, electromagnetic induction can be conveniently used and would be desirable in view of the lower power requirements for radio-wave commuication than in other communication systems.

The electromagnetic induction between the controller and the transmitter must be reliable whenever transmission of codes between the controller and the transmitter is ordered. However, as is well known, electromagnetic induction is influenced significantly by the polarity of the magnetic fields around the controller and the transmitter. For instance, when the magnetic flux is essentially parallel to the antenna axis, the sensitivity of the antenna is significantly decreased, which often leads to failure of communication. On the other hand, the space for mounting the antenna on the vehicle is quite limited. Therefore, the size of the antenna is strictly limited. On the other hand, since the transmitter is of the size of a bank card or credit card for convenience, the size of the antenna is strictly limited.

Therefore, a compact and effective antenna for an automotive keyless entry system is required.

SUMMARY OF THE INVENTION

Therefore, it is an object of the present invention to provide an antenna for an automotive keyless entry system which can ensure radio-wave transmission between a transmitter and a controller.

Another object of the invention is to provide an antenna which can be conveniently mounted on a vehicle body.

In order to accomplish the above-mentioned and other objects, an antenna for an automotive keyless entry system, according to the present invention, comprises a first planar antenna loop, and a second antenna loop disposed within the first antenna loop and lying in the plane thereof. The axis of the second antenna is substantially perpendicular to the axis of the first antenna loop. The first and second antenna loops form an antenna assembly which can be conveniently mounted on the vehicle body.

Specifically, the aforementioned antenna assembly is adapted to be housed within a door mirror of the vehicle.

Preferably, a ferromagnetic core is provided within the first planar antenna loop and the second antenna loop employs this ferromagnetic core.

According to one aspect of the invention, an antenna is employed in an automotive keyless entry system for operating a vehicle device by means of a radio code signal transmitter transmitting a radio signal indicative of a preset code which identifies the radio code transmitter, and a controller receiving the radio signal and comparing the received code with a preset code therein for generating a control signal for operating the vehicle device when the received code matches the preset code in the controller, the transmitter having a loop antenna, and the controller being connected with a loop antenna mounted on a vehicle body and adapted to establish radio communication between the loop antenna in the transmitter by way of electromagnetic induction. The antenna to be mounted on the vehicle body comprises a first loop antenna component forming a planar antenna loop, and a second loop antenna component having a smaller loop and disposed within the circumference of the first loop antenna component, the axis of the second loop antenna component being substantially perpendicular to the axis of the first loop antenna component.

The second loop antenna component is wound around a ferromagnetic core which lies within the first antenna loop component and in the plane thereof.

Preferably, the first and second loop antenna components are coupled by way of inductive coupling and one of the first and second loop antenna components is connected to the controller.

The antenna is preferably disposed within a door mirror housing.

The antenna may further comprise a third loop wound around the ferromagnetic core coaxially with the second loop antenna component and coupled with the second loop antenna component by way of inductive coupling. The third loop serves to couple the first and second loop components by way of inductive coupling.

The first and second loop antenna components are electrically connected to each other and the second loop antenna component is connected to the controller through a lead wire. The antenna further comprises a capacitor between the first and second loop antenna components.

According to another aspect of the invention, a keyless entry system for an automotive vehicle device for actuating the vehicle device, comprises an electrical actuator connected to the vehicle device and responsive to a control signal to operate the vehicle device to a position ordered by the control signal, a manual switch, a transmitter transmitting a radio code signal indicative of a unique code which identifies the transmitter, a first antenna associated with the transmitter for transmitting the radio code signal therethrough, a controller responsive to manual operation of the manual switch to generate a radio demand signal to activate the transmitter, to transmit the radio demand signal to the transmitter, to receive the unique code indicative radio code signal from the transmitter, to compare the unique code with a preset code, and to generate the control signal when the unique code matches the preset code, and a second and third antenna mounted on a vehicle for establishing radio signal communication between the first antenna by way of electromagnetic induction, the second antenna forming a first planar antenna loop, and the third antenna being disposed in the plane of the first loop and forming a second antenna loop, the axis of which lies substantially perpendicular to the axis of the first antenna loop.

In the preferred embodiment, the second antenna loop is wound around a ferromagnetic core disposed within the circumference of the first antenna loop of the second antenna.

A keyless entry system further comprises a third loop wound around the ferromagnetic core for coupling the second and third antenna by way of inductive coupling. The third antenna is electrically connected to the controller. The second and third antennas are connected to one another by means of a connecting circuit.

In practice, the second and third antenna are preferably disposed near the manual switch. The vehicle device to be operated is a door lock mechanism, and the manual switch is mounted on an outside door handle of the vehicle. The second and third antennas are disposed within a door mirror housing.

DESCRIPTION OF THE PREFERRED EMBODIMENT

Before disclosing the detailed construction of the preferred embodiment of a radio code signal transmitter according to the present invention, the preferred embodiment of a keyless entry sytem and operation thereof will be described in order to facilitate better understanding of the present invention.

Figure 1:
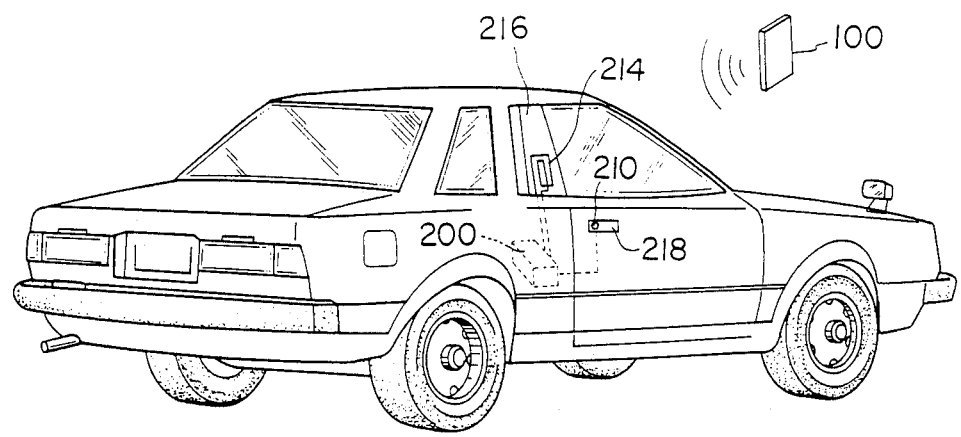
FIG. 1 is a perspective view of an automotive vehicle which is provided with the preferred embodiment of a keyless entry system according to the present invention.

Referring now to the drawings, particularly to FIG. 1, the preferred embodiment of the keyless entry system according to the invention, generally comprises a radio code signal transmitter 100 and a controller 200. The radio code signal transmitter 100 is of a generally thin bank or credit card-like configuration and is equivalent in size to a bank or credit card. On the other hand, the controller 200 is mounted at an appropriate position within the passenger compartment of an automotive vehicle.

Figure 2:
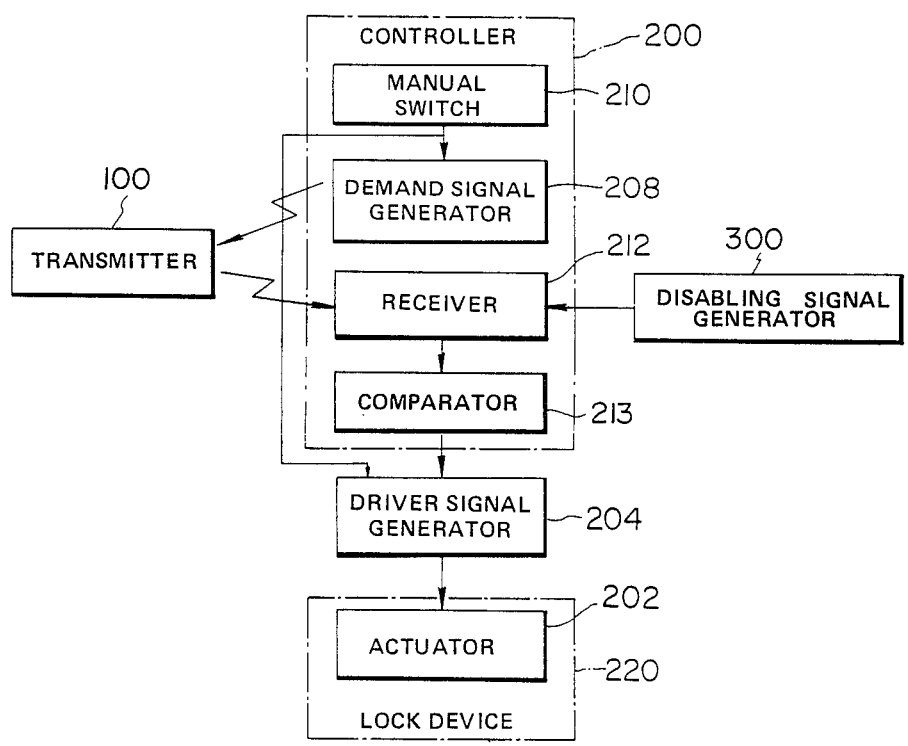
FIG. 2 is a schematic block diagram of the general concept of the keyless entry system for automotive vehicle devices, such as a door lock mechanism, according to the invention.

As shown in FIGS. 1 and 2, the controller 200 is connected via a driver signal generator 204 to actuators 202 for vehicle devices 220 such as a door lock device, a trunk lid lock device, a glove box lid lock and a steering lock device. The controller 200 is also connected to a disable signal generator 300 which can produce a disable signal to selectably disable the controller. The disable signal generator 300 responds to predetermined conditions by producing the disable signal.

In the first embodiment, the disable signal generator 300 detects when an ignition switch 302 is in a position other than the OFF position. For instance, the disable signal generator 300 outputs the disable signal when the ignition switch 302 is in the ACC position, wherein electric power is supplied to electrical accessories in the vehicle, or the IGN position, wherein electric power is supplied to an engine ignition system and to the electrical accessories, or the START position wherein electric power is applied to a starter motor (not shown).

The controller 200 includes a radio demand signal SD generator 208 which sends a radio demand signal SD to the radio code signal transmitter 100 to activate the latter. The radio demand signal SD generator 208 is connected to one or more manual switches 210 which are placed on the external surface of the vehicle so as to be accessible from outside the vehicle. The radio demand signal SD generator 208 produces the radio demand signal SD when one of the manual switches 210 is depressed.

Figure 3:
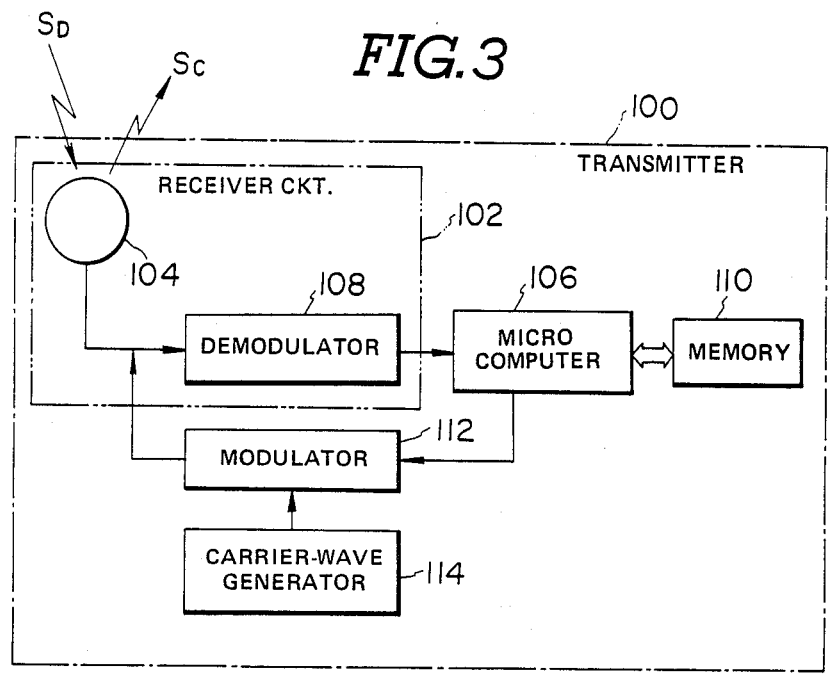
FIG. 3 is a block diagram of a radio code signal transmitter in the preferred embodiment of the keyless entry system of FIG. 2.

As shown in FIG. 3, the radio code signal transmitter 100 includes a receiver circuit 102 for receiving the radio demand signal SD from the controller. The radio code signal transmitter 100 becomes active when the receiving circuit 102 receives the radio demand signal SD to produce a radio code signal SC which is indicative of a preset specific code. The preset code of the portable radio code signal transmitter 100 differs from that of the radio demand signal SD generator 208 so that the controller 200 can recognize when the radio code signal transmitter 100 is responding.

The radio code signal transmitter 100 continuously transmits the radio code signal SC to the controller for as long as it remains active. The radio code signal SC is received by a receiver 212 in the controller 200. The controller 200 has a comparator 213 to compare the received code with a specific preset code. When the received code matches the code preset as compared in the comparator 213, the controller 200 sends a control signal SL to the driver signal generator 204. The driver signal generator 204 in turn sends a drive signal to one of the actuators 202 corresponding to the manual switch 210 operated. The actuator 202 is activated by the driver signal from the driver signal generator 204 to operate the corresponding vehicle device.

It should be appreciated that, since the vehicle devices to be operated by the first embodiment of the keyless entry system are two-state locking devices for locking and unlocking vehicle doors, the trunk lid, the glove box lid, the steering column and so forth, the actuators 202 actuate the vehicle devices from the current position to the opposite position in response to the driver signal. For instance, when the vehicle device is in the locked position, the actuator unlocks the vehicle device in response to the driver signal. On the other hand, when the driver signal is sent to the actuator of a vehicle device which is currently unlocked, that vehicle device is then locked.

The radio code signal transmitter 100 includes a transmitter/receiver antenna 104. In addition, a loop antenna 214 is built into an appropriate position of the vehicle, such as one of the windows 216 of the vehicle or in a side mirror. The loop antenna 214 transmits the radio demand signal SD to and receives the radio code signal SC from the radio code signal transmitter 100. As shown in FIG. 1, the manual switches 210 are mounted on an escutcheon 218 of an outside door handle for operation from outside the vehicle.

FIG. 3 shows the circuit structure of the radio code signal transmitter 100. A microprocessor 106 is connected to the antenna 104 via a demodulator 108 which demodulates the received radio demand signal SD. The microprocessor 106 includes a memory 110 storing the preset code. In response to the radio demand signal SD, the microprocessor 106 reads the preset code out to a modulator 112. The modulator 112 is, in turn, connected to a carrier-wave generator 114 to receive a carrier wave. The modulator 112 modulates the carrier-wave with the code-indicative signal from the microprocessor 106 to produce the final radio code signal SC.

In the preferred embodiment, the antenna 104 of the radio code signal transmitter 100 is built into the transmitter circuit board or on the surface of a transmitter housing. The housing is the size of a name card and thin enough to carry in a shirt pocket. The transmitter 100 uses a long-life, compact battery, such as a mercury battery, as a power source.

Figure 4:
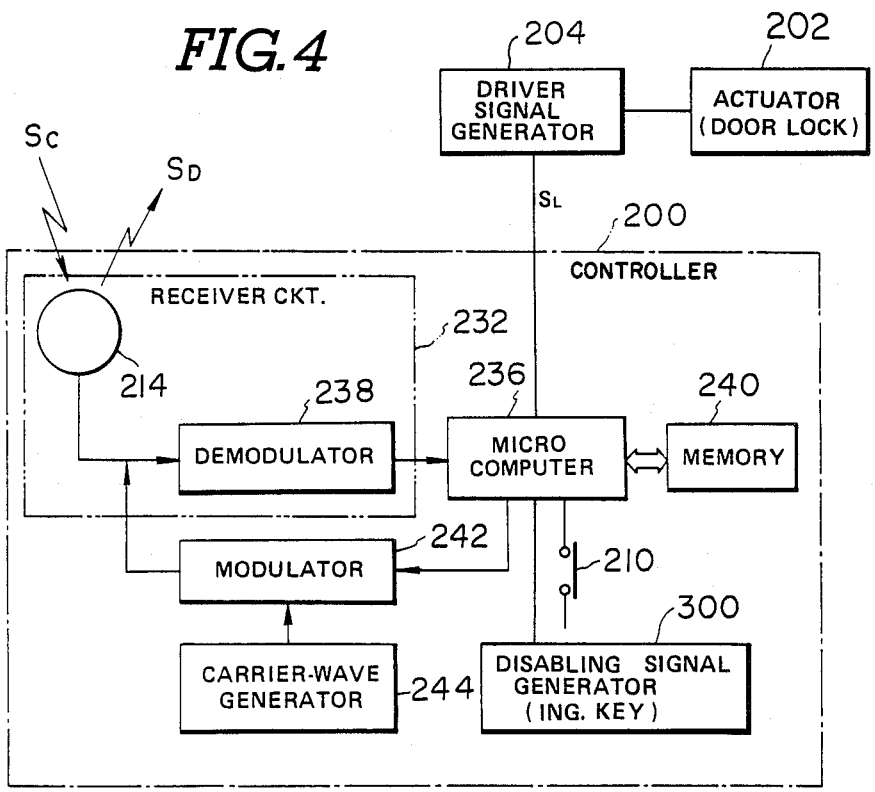
FIG. 4 is a block diagram of a controller in the preferred embodiment of the keyless entry system of FIG. 2.

FIG. 4 shows the practical circuit structure of the controller 200 which has been disclosed functionally with reference to FIG. 2. As seen from FIG. 4, the controller 200 generally comprises a microprocessor 236 which is connected to the antenna 214 through a demodulator 238, which together constitute a receiver circuit 232 receiving the radio code signal $S_c$ from the radio code signal transmitter 100. Also, the microprocessor 236 is connected for output to the antenna 214 through a modulator 242. The modulator 242 is also connected to a carrier-wave generator 244 to receive therefrom a carrier wave of a predetermined frequency. The modulator 242 modulates the carrier wave in accordance with a demand indicative signal from the microprocessor and transmits the resulting radio demand signal to the antenna 214.

The microprocessor 236 has internal or external memory 240 such as a programable ROM or the like. Preset codes, one of which corresponds to the demand for activating the radio code signal transmitter 100 and the other of which corresponds to the preset code in the radio code signal transmitter, are stored in the memory 240.

As set forth above, the microprocessor 236 is also connected to a disabling signal generator 300, such as the ignition switch. The microprocessor 236 is disabled in response to the disabling signal from the disabling signal generator when a predetermined disabling factor is detected. Unless disabled by the disabling signal, the microprocesor 236 receives the radio code signal from the radio code signal transmitter 100, compares the received code with the preset code in the memory 240, and outputs the control signal to a driver signal generator 204 for operating the actuator 202.

The operation of the aforementioned embodiment the keyless entry system set forth above will be described in more detail with reference to FIGS. 5(A) and 5(B). The microprocessor 106 of the radio code signal transmitter 100 repeatedly executes the first control program illustrated in FIG. 5(A). In the first control program, the microprocessor 106 checks for receipt of the radio demand signal SD from the controller at a step 1002. The step 1002 is repeated until the radio demand signal SD is received. In other words, the radio code signal transmitter 100 normally remains in a stand-by state, waiting to produce the radio code signal SC in response to the radio demand signal SD.

When the radio demand signal SD is detected at the step 1002, the preset code is read from the memory 110 at a step 1004. The microprocessor 106 then outputs the preset code-indicative signal to the modulator 112 which, in turn, outputs the radio code signal SC in step 1006. Control then returns to the stand-by step 1002.

It should be noted that the radio code signal SC is transmitted from the modulator to the controller 200 for a given period of time and terminates when the given period of time expires. The given period of time during which the radio code signal SC is transmitted is so chosen that the controller 200 can activate the actuator 202 designated by the operated manual switch 210 before expiration of that period. In addition, the preset code stored in the memory 100 is preferably a binary code, such as an 8-bit serial datum. This binary code rides on the carrier wave as modulated by the modulator to form the radio code signal SC.

Figure 5:
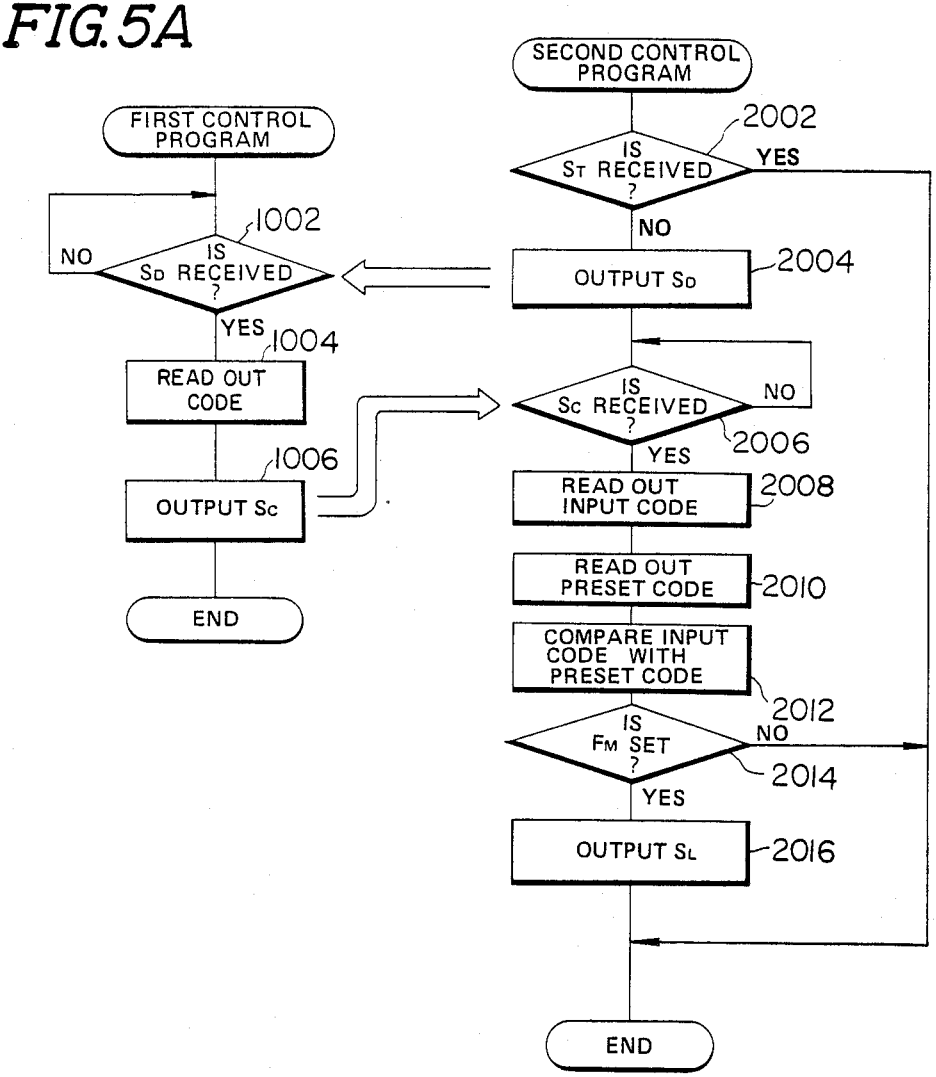
FIGS. 5(A) and 5(B) are flowcharts of the operation of the transmitter of FIG. 3 and the controller of FIG. 4.

FIG. 5(B) is flowchart for the controller 200. At the initial stage of the control program of FIG. 5(B), the microprocessor 232 checks whether or not a disabling signal $S_f$ is input at a step 2002. If the disabling signal $S_T$ is not detected when checked at the step 2002 control passes to a step 2004, wherein the modulator 242 is activated to send a radio demand signal SD to the radio code signal transmitter 100 to activate the latter. Thereafter, the controller 200 enters a second stand-by state, waiting for the radio code signal SC. Specifically, a step 2006 is repeated for a fixed period of time as a loop until the radio code signal SC is received. After the radio code signal SC is input via the antenna 214 and the demodulator 238, the received code in the radio code signal SC is read out at a step 2008. The preset code of the controller 200 is then read out from the memory 240, at a step 2010. The input code and the preset code read out in steps 2008 and 2010 are compared at a step 2012. If the codes match, a matching flag FM is set at the step 2012. The matching flag FM is checked at a step 2014. If the matching flag FM is not set, the program ends. On the other hand, if the matching flag FM is set when checked at the step 2014, then the control signal SL is sent to the driver signal generator 204 at a step 2016.

In this embodiment as set forth above, since the radio code signal SC is output only when the demand signal DS is input from the controller, consumption of electric power of the battery in the transmitter is significantly reduced in comparison with system which might employ constant transmission of the radio code signal SC. Thus, the life-time of the battery of the transmitter is prolonged even though electric power is constantly supplied to the microprocessor to hold same in stand-by. It should be appreciated that the electric power needed to power the microprocessor is substantially smaller than that consumed in transmitting the radio code signal SC. Therefore, a constant power supply to the microprocessor will not significantly affect the life-time of the battery.

It should be also appreciated that the control signal $S_L$ serves to actuate the associated vehicle device to the desired position. For instance, when the vehicle device to be operated is the door lock device, the position of the door lock device is reversed between its locked and unlocked positions each time the control signal $S_L$ is generated. Therefore, in the step 2016, the control signal $S_L$ for reversing the door lock device position is output when the manual switch 210 associated with the door lock device is manually depressed.

Figure 6:
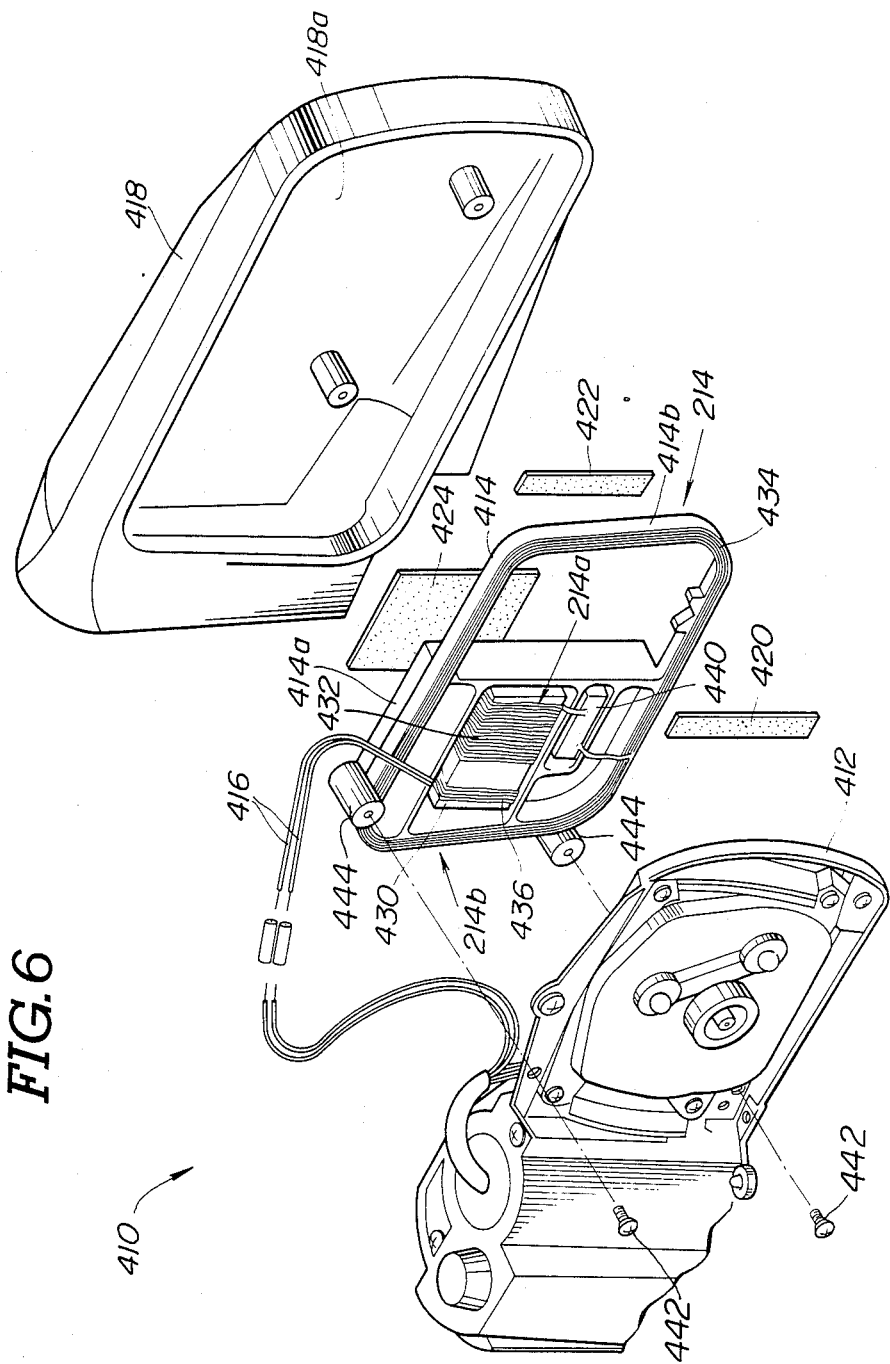
FIG. 6 is an exploded perspective view of a door mirror of the vehicle, in which the preferred embodiment of an antenna for the keyless entry system is housed.

FIG. 6 shows the preferred embodiment of antenna 214 employed in the above-mentioned keyless entry system. In this embodiment, the antenna 214 is housed within a door mirror 410 mounted on a vehicle side door. The door mirror generally comprises a mirror housing 418 and a mirror base 412 which pivotably supports a mirror (not shown). The mirror base 412 also serves to mount the door mirror assembly onto the vehicle side door. The mirror housing 418 and the mirror base 412 engage each other to define an internal space accommodating the antenna assembly 214.

As set forth above, the antenna 214 is connected to the microprocessor 236 through the demodulator 238 and the modulator 242 through a pair of lead wires 416. So as to insulate the antenna 214 from the mirror housing 418 and the mirror base 412, insulator members 420, 422 and 424 are disposed between the antenna assembly and the mirror base and between the antenna assembly and the mirror housing. In the preferred embodiment, a butyl rubber sheet is used in the insulator members 420, 422 and 424. These butyl rubber sheets 420, 422 and 424 serve not only to electrically insulate the antenna 214 from the mirror base 412 and the mirror housing 418 but also to absorb vibrations transmitted through the mirror base and/or mirror housing.

Figure 7:
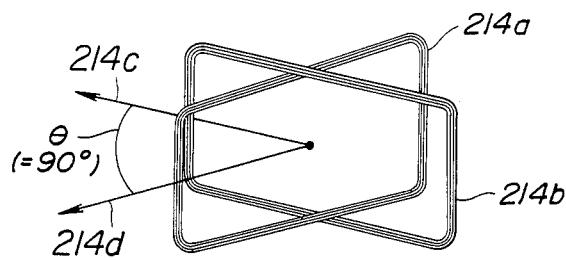
FIG. 7 is a diagram of the relationship between the polarities of a first antenna loop and a second antenna loop in the preferred embodiment of the antenna in FIG. 6.
Figure 8:
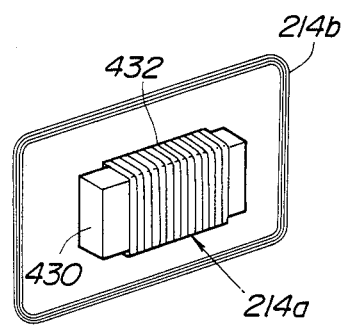
FIGS. 8 and 9 are diagrams of the antenna of FIG. 6, showing the arrangement of the first and second antenna loops of the preferred embodiment of the antenna.

As seen from FIG. 6, the antenna 214 is constructed as a loop antenna designed for electromagnetic induction with the antenna 104 mounted in the radio code signal transmitter 100. The loop antenna 214 comprises a first antenna loop 214a and a second antenna loop 214b. The first antenna loop 214a is formed by winding a lead wire 432 into a loop. Similarly, the second antenna loop 214b is formed by winding a lead wire 434 into a loop. The axes of winding of the first and second antenna loops 214a and 214b are perpendicular to each other. With this arrangement, the antenna axes 214c and 214d of the antenna loops 214a and 214b subtend an angle $\theta$ of approximately 90°, as illustrated in FIG. 7. Furthermore, the antenna loop 214a is wound around a ferromagnetic core 430, such as a ferrite core. The ferromagnetic core 430 and the first antenna loop 214a is mounted on a first support section 414a of the antenna base 414. The first support 414a is integral with an annular second support section 414b. The second support section 414b generally comforms to the opening 418a of the mirror housing 418. The first support section 414a extends between the upper and lower horizontal legs of the second support section 414b and near one vertical leg thereof. The second antenna loop 214b is wound on the outer periphery of the second support 414b. With this arrangement, the first antenna loop 214a is disposed within the second antenna loop 214b and its axis lies in the plane of the second antenna loop 214b, as illustrated in FIG. 8.

Figure 9:
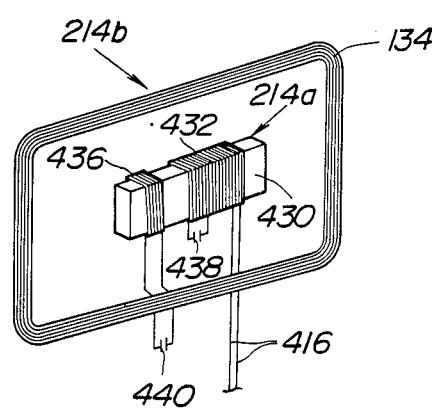
Figure 10:
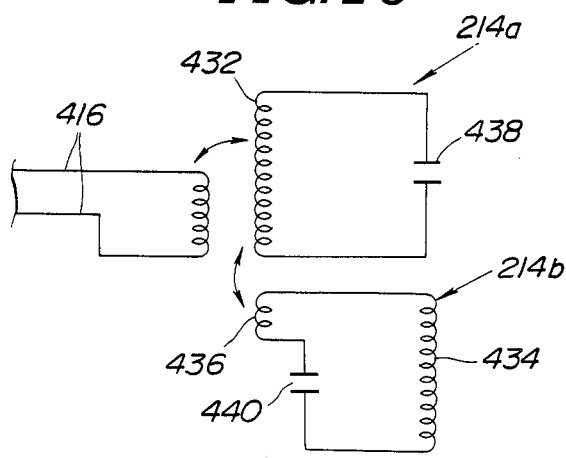
FIG. 10 is a schematic circuit diagram of the antenna circuit of the antenna in FIG. 9.

As shown in FIGS. 6 and 9, another loop 436 is formed by winding a lead wire around the ferromagnetic core 430 in coaxial relationship with the first antenna loop 214a. Furthermore, the lead wires 416 for connecting the antenna 214 to the microprocessor 236 are also wound around the ferromagnetic core 430 together with the first antenna loop 214a. The lead wires 416 are coupled with the first antenna loop 214a by way of inductive coupling, as illustrated in FIG. 10. Also, the loop 436 is coupled with the first antenna loop 214a by way of inductive coupling.

Capacitors 438 and 440 are respectively connected in series to the first antenna loop 214a and the loop 436. The capacitors 438 and 440 are coupled inductively to act as a capacitor unit 440', as shown in FIGS. 6 and 10.

When assembling the antenna 214 into the door mirror 410, first a pre-assembly of the antenna base 414 the first and second antenna loops 214a and 214b, the capacitor 440, the additional loop 236 and the lead wire 416 is formed. This pre-assembly is secured in the opening 418a of the mirror housing 418 by means of fastening screws 442 extending through boss sections 444 integral with the antenna base 414. This simplifies assembly of the antenna 214 in the door mirror 410.

Figure 11:
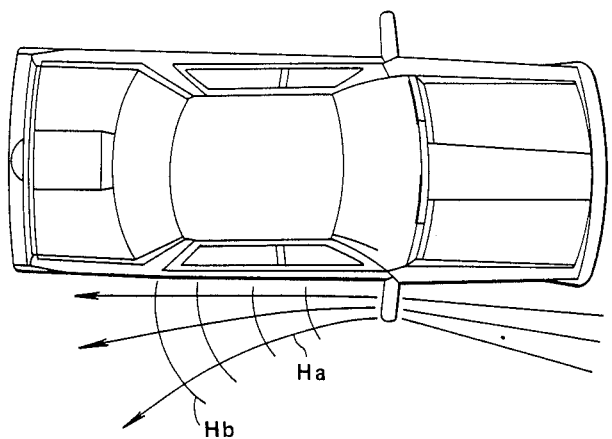
FIG. 11 is a diagram of the magnetic field around the door mirror of FIG. 6.

In use, since the axes of the first and second antenna loops 214a and 214b are perpendicular to each other, the magnetic fields $H_a$ and $H_b$ generated around the door mirror 410 by respective loops 214a and 214b are offset by 90°, as shown in FIG. 11. By providing 90°-offset magnetic fields $H_a$ and $H_b$ around the door mirror 410, electromagnetic induction between the antenna 104 of the radio code signal transmitter 100 and the antenna 214 can be induced irrespective of the direction and/or orientation of the antenna 104 of the radio code signal transmitter. This ensures radio communication between the radio code signal transmitter 100 and the controller 200.

Since the first antenna loop 214a is formed around the ferromagnetic core 430, a sufficiently strong magnetic field can be generated thereabout. The strength of the magnetic field around the first antenna loop 214a is substantially equivalent to that generated by the second antenna loop 214b. This allows the first antenna loop 214a to be compact enough to be disposed within the second antenna loop 214b.

Furthermore, by building in the antenna 214 into the door mirror 410, the antenna 214 can be separated from the vehicle body which exhibits high electrical conductivity. This successfully avoids the influence of vehicle pannels on radio communication.

Figure 12:
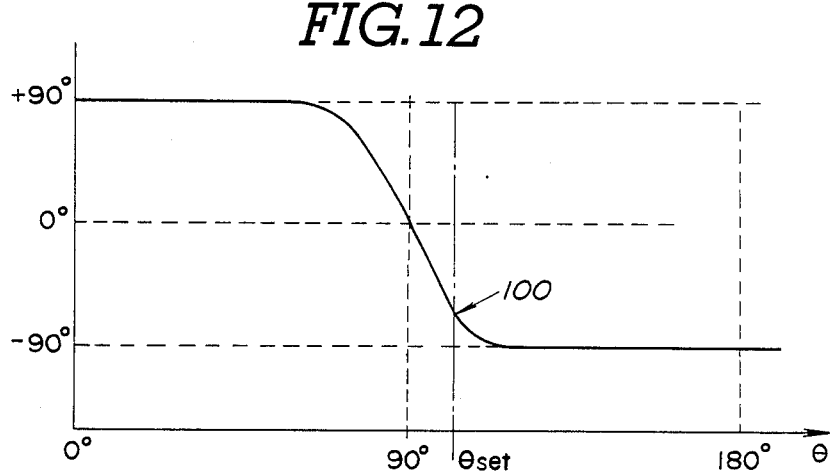
FIGS. 12 and 13 show the distribution of the magnetic field strength around the antenna.
Figure 13:
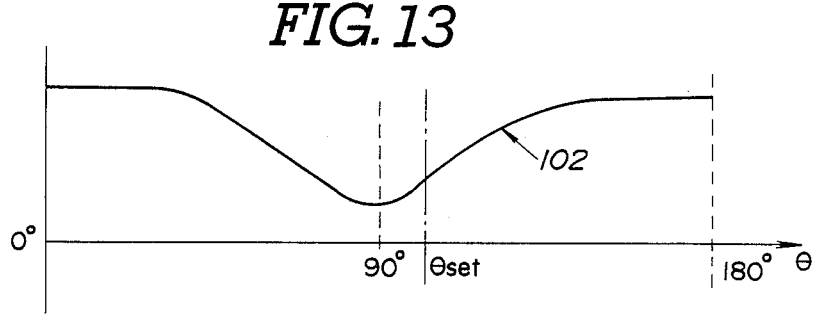

Preferably, the first and second antenna loops 214a and 214b are coupled by way of inductive coupling with an angle $\theta_{set}$ slightly greater than 90°. This angle $\theta_{set}$ accurately provides an offset of 90° between the first and second antenna loops 214a, and 214b, as shown in FIG. 12. On the other hand, by providing 90°-offset magnetic fields $H_a$ and $H_b$, an esentially circular revolving magnetic field is generated around the door mirror 410. The revolving characteristics of the coupling coefficient is as illustrated in FIG. 13.

As set forth above, the antenna for the keyless entry system according to the present invention, can be installed on the vehicle conveniently as a single unit. Furthermore, since the antenna of the present invention has two antenna components offset by 90°, communication between the radio code transmitter and the controller can be ensured. In addition, by connecting the pair of antenna components through a capacitor unit, only one pair of lead wires are required to connect the antenna to the microprocessor of the controller. This avoids the need for a phase-shift circuit which would otherwise be required if the antenna components were connected to the microprocessor separately.

It should be appreciated that although the aforementioned embodiment of the antenna is built into the door mirror, the antenna of the invention can be mounted at any appropriate location on the vehicle, such as in a bumper, in the case of operating a trunk lid opener.

As will be appreciated from the above discussion, the present invention fulfills all of the objects and advantages sought therefor.

What is claimed is:

1. In an automotive keyless entry system for operating a vehicle device by means of a radio code signal transmitter transmitting a radio signal indicative of a preset code which identifies said radio code transmitter, and a controller receiving said radio signal and comparing the received code with a preset code therein for generating a control signal for operating said vehicle device when the received code matches said preset code in said controller, said transmitter having a loop antenna, and said controller being connected with a loop antenna mounted on a vehicle body and adapted to establish radio signal communication between said loop antenna in said transmitter by way of electromagnetic induction,
  said antenna to be mounted on said vehicle body comprising:
    a first loop antenna component forming a planar antenna loop;
    a second loop antenna component having a smaller loop and disposed within the circumference of said first loop antenna component, the axis of said second loop antenna component being substantially perpendicular to the axis of said first loop antenna component; and
    a coupling means for coupling between said first loop antenna component and said second loop antenna component by way of inductive coupling.

2. An antenna as set forth in claim 1, wherein said second loop antenna component is wound around a ferromagnetic core which lies within said first antenna loop component and in the plane thereof.

3. An antenna as set forth in claim 1, wherein said first and second loop antenna components are coupled by way of inductive coupling and one of said first and second loop antenna components is connected to said controller.

4. An antenna as set forth in claim 1, which is disposed within a door mirror housing.

5. An antenna as set forth in claim 2, which further comprises a third loop wound around said ferromagnetic core coaxially with said second loop antenna component and coupled with said second loop antenna component by way of inductive coupling.

6. An antenna as set forth in claim 5, wherein said third loop serves to couple said first and second loop components by way of inductive coupling.

7. An antenna as set forth in claim 1, wherein said first and second loop antenna components are electrically connected to each other and said second loop antenna component is connected to said controller through a lead wire.

8. An antenna as set forth in claim 7, which further comprises a capacitor between said first and second loop antenna components.

9. A keyless entry system for an automotive vehicle device for actuating the vehicle device, comprising:
    an electrical actuator connected to said vehicle device and responsive to a control signal to operate said vehicle device into one of at least first and second positions in response to said control signal;
    a manual switch;
    a transmitter responsive to a radio demand signal for transmitting a radio code signal indicative of a unique code which identifies said transmitter;
    a first antenna associated with said transmitter for transmitting said radio code signal;
    a controller responsive to manual operation of said manual switch to generate said radio demand signal to said transmitter, said controller receiving said radio code signal from said transmitter, to compare said unique code with a preset code, and to generate said control signal when said unique code matches said preset code;
    a second and third antenna mounted on a vehicle for establishing radio signal communication between said first antenna by way of electromagnetic induction, said second antenna forming a first planar antenna loop, and said third antenna being disposed in the plane of said first loop and forming a second antenna loop, the axis of which lies substantially perpendicular to the axis of said first antenna loop; and
    a coupling means for coupling between said second antenna and third antenna by way of inductive coupling.

10. A keyless entry system as set forth in claim 9, wherein said second antenna loop is wound around a ferromagnetic core disposed within the circumference of said first antenna loop.

11. A keyless entry system as set forth in claim 10, which further comprises a third antenna loop wound around said ferromagnetic core for coupling said second and third antenna by way of inductive coupling.

12. A keyless entry system as set forth in claim 11, wherein said third antenna is electrically connected to said controller.

13. A keyless entry system as set forth in claim 10, wherein said second and third antennas are connected to one another by means of a connecting circuit.

14. A keyless entry system as set forth in claim 9, wherein said second and third antenna are disposed near said manual switch.

15. A keyless entry system as set forth in claim 14, wherein said vehicle device to be operated is a door lock mechanism, and said manual switch is mounted on an outside door handle of the vehicle.

16. A keyless entry system as set forth in claim 15, wherein said second and third antennas are disposed within a door mirror housing.

17. An antenna as set forth in claim 2, wherein said coupling means has a third loop which is coaxially wound around said ferromagnetic core and is arranged within the circumference of said first loop antenna component.

18. An antenna as set forth in claim 17, wherein said third loop is electrically connected to the said first antenna component.

19. In an automotive keyless entry system for operating a vehicle transmitting a radio signal indicative of a preset code which identifies said radio code transmitter, and a controller receiving said radio signal and comparing the received code with a preset code therein for generating a control signal for operating said vehicle device when the received code matches said preset code in said controller, said transmitter having a loop antenna, and said controller being connected with a loop antenna mounted on a vehicle body and adapted to establish radio signal communication between said loop antenna in said transmitter by way of electromagnetic induction,
said antenna to be mounted on said vehicle body comprising:
a first loop antenna component forming a planar antenna loop;
a second loop antenna component having a smaller loop and disposed within the circumference of said first loop antenna component, the axis of said second loop antenna component being substantially perpendicular to the axis of said first loop antenna component; and
a coupling means for coupling between said first loop antenna component and said controller and between said second loop antenna component and said controller by way of inductive coupling.

20. An antenna as set forth in claim 19 wherein said second antenna component is wound around a ferromagnetic core which arranged within said first antenna loop component and in the plane thereof.

21. An antenna as set forth in claim 19 wherein said first and second loop antenna components are coupled by way of inductive coupling.

22. An antenna as set forth in claim 19 which is disposed within a door mirror housing.

23. An antenna as set forth in claim 20 wherein said coupling means has a third loop which is coaxially wound around said ferromagnetic core and said third loop is connected to said controller.

24. An antenna as set forth in claim 23 which further comprises a capacitor provided within said first and second antenna components.

25. A keyless entry system as set forth in claim 24 wherein said coupling means has a third loop which is wound around said ferromagnetic core coaxially with said second antenna loop.

26. A keyless entry system as set forth in claim 25 wherein said third loop is directly connected to said first antenna loop.

27. A keyless entry system for an automotive vehicle device for actuating the vehicle device, comprising:
an electrical actuator connected to said vehicle device and responsive to a control signal to operate said vehicle device into one of at least first and second positions in response to said control signal;
a manual switch;
a transmitter responsive to a radio demand signal for transmitting a radio code signal indicative of a unique code which identifies said transmitter;
a first antenna associated with said transmitter for transmitting said radio code signal;
a controller responsive to manual operation of said manual switch to generate said radio demand signal to said transmitter, said controller receiving said radio code signal from said transmitter, to compare said unique code with a preset code, and to generate said control signal when said unique code matches said preset code;
a second and third antenna mounted on a vheicle for establishing radio signal communication between said first antenna by way of electromagnetic induction, said second antenna forming a first planar antenna loop, and said third antenna being disposed in the plane of said first loop and forming a second antenna loop, the axis of which lies substantially perpendicular to the axis of said first antenna loop; and
a coupling means for coupling between said first and second antenna loops and said controller by way of inductive coupling.

28. A keyless entry system as set forth in claim 27, wherein said second antenna loop is wound around a ferromagnetic core disposed within the circumference of said first antenna loop.

29. A keyless entry system as set forth in claim 28, wherein said coupling means has a smaller loop which is wound around said ferromagnetic core coaxially with said second antenna loop.

30. A keyless entry system as set forth in claim 28, wherein said second and third antenna are connected to one another by means of a connecting circuit.

31. A keyless entry system as set forth in claim 27, wherein said second and third antenna are disposed near said manual switch.

32. A keyless entry system as set forth in claim 31, wherein said vehicle device to be operated is a door lock mechanism, and said manual switch is mounted on an outside door handle of the vehicle.

33. A keyless entry system as set forth in claim 32, wherein said second and third antennas are disposed within a door mirror housing.

* * * * *